April 15, 1958  J. L. E. ISHEE  2,830,423
COTTON PICKING DEVICE WITH BEATER MEANS
Filed June 26, 1956  3 Sheets-Sheet 1
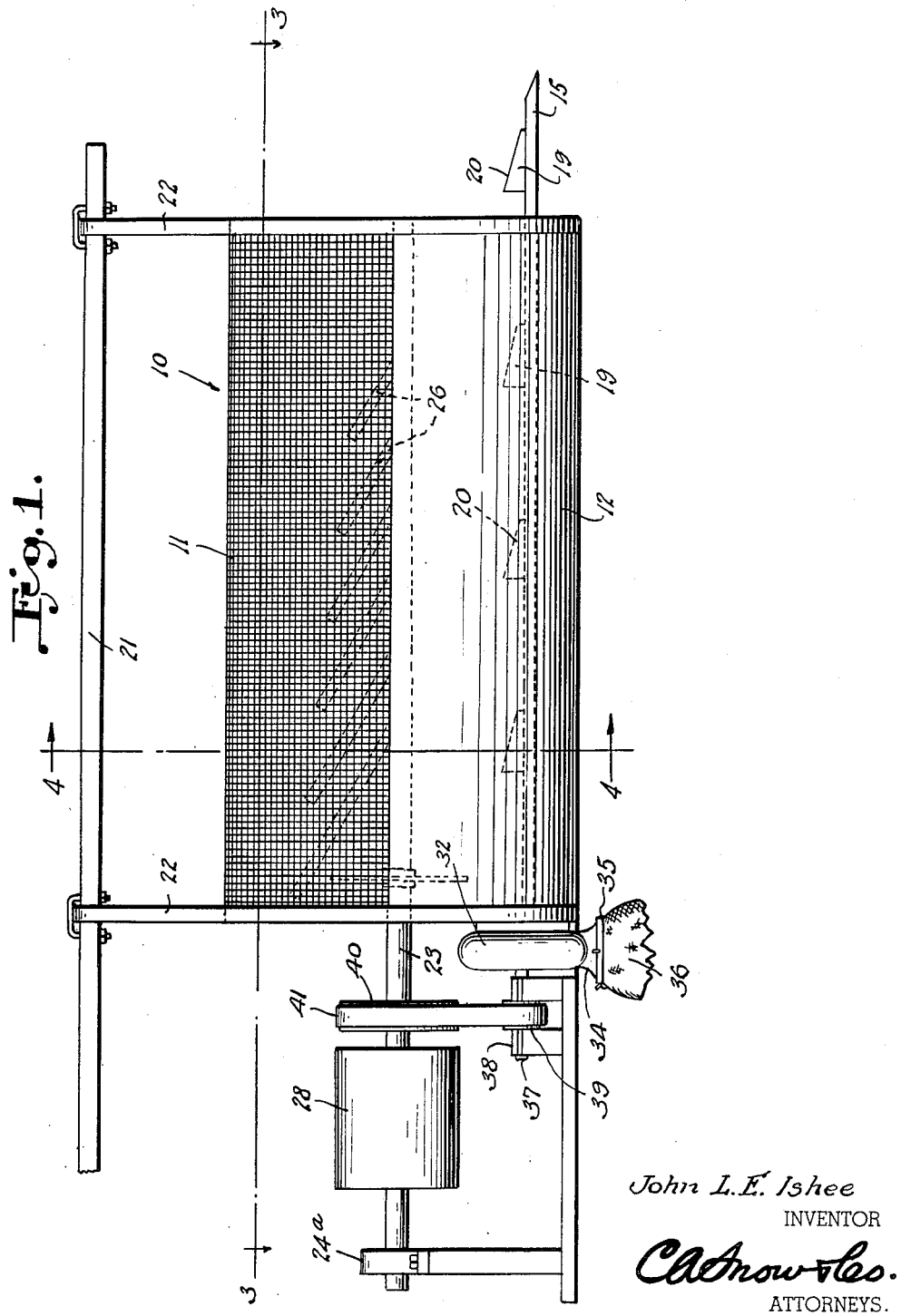
John L. E. Ishee
INVENTOR
ATTORNEYS.

April 15, 1958   J. L. E. ISHEE   2,830,423
COTTON PICKING DEVICE WITH BEATER MEANS
Filed June 26, 1956   3 Sheets-Sheet 2
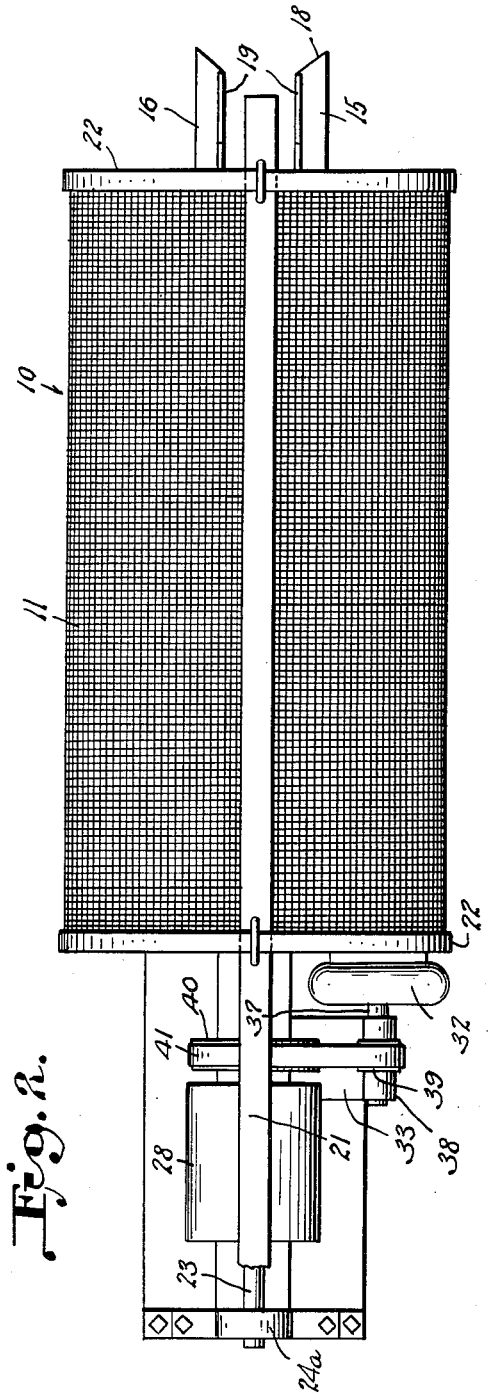
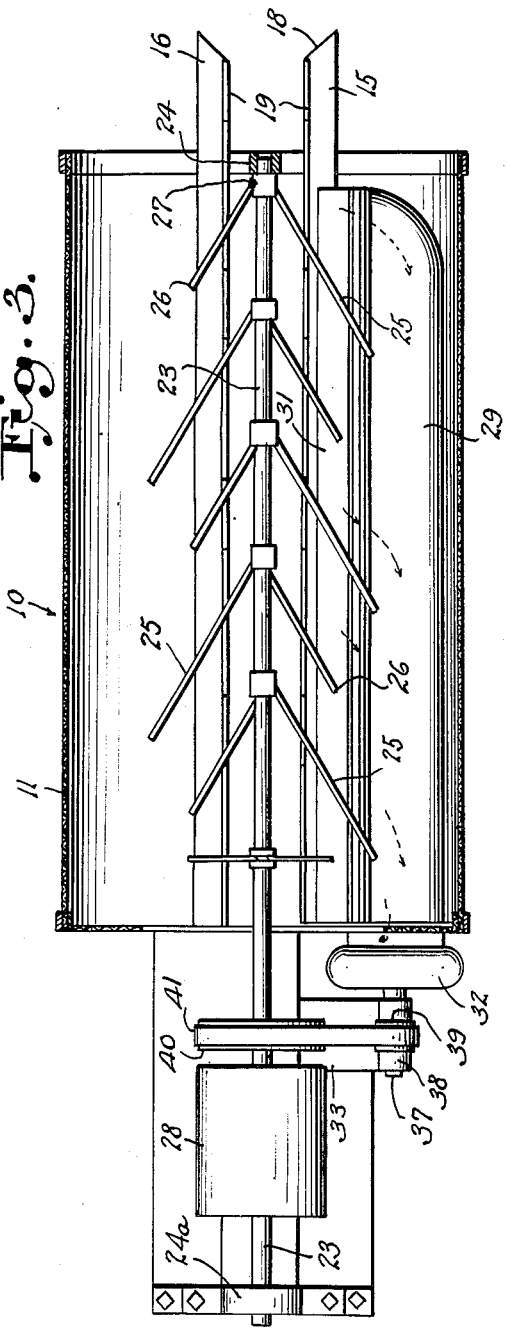
John L. E. Ishee
INVENTOR
BY
ATTORNEYS.

April 15, 1958   J. L. E. ISHEE   2,830,423
COTTON PICKING DEVICE WITH BEATER MEANS
Filed June 26, 1956   3 Sheets-Sheet 3

INVENTOR.
John L. E. Ishee
BY
CA Snow & Co.
ATTORNEYS.

United States Patent Office 2,830,423
Patented Apr. 15, 1958

2,830,423

COTTON PICKING DEVICE WITH BEATER MEANS

John L. Eldrege Ishee, Seminary, Miss.

Application June 26, 1956, Serial No. 593,882

1 Claim. (Cl. 56—29)

This invention relates to a cotton picking machine.

An object of this invention is to provide a machine by means of which cotton may be removed from the stalks and deposited in a collector.

Another object of this invention is to provide a cotton picking machine which may be attached to a tractor for operation and movement thereby.

A further object of this invention is to provide a cotton picking machine which includes rotatable picking fingers with a suction means to remove the cotton from the fingers.

A further object of this invention is to provide a cotton picking machine which includes means for raising lower branches to a position wherein any cotton bolls on the lower branches will be removed.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a fragmentary side elevation of a cotton picker constructed according to an embodiment of this invention.

Fig. 2 is a plan view of the device.

Fig. 3 is a sectional view taken substantially on the line 3—3 of Fig. 1.

Figure 4:
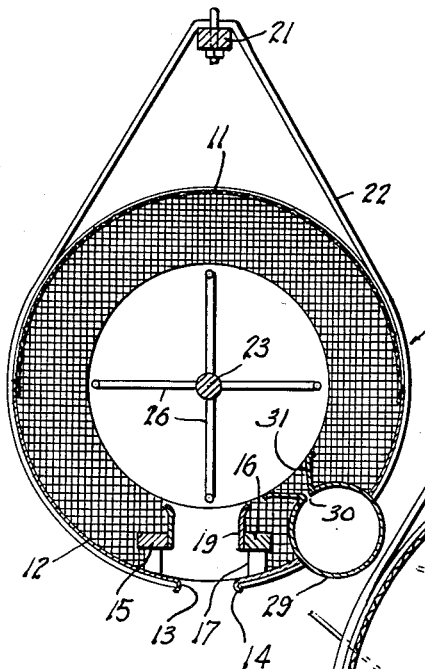
Fig. 4 is a vertical section taken substantially on line 4—4 of Fig. 1.

Referring to the drawings, the numeral 10 designates generally an elongated cylindrical body or tubular member which is formed of an upper semi-cylindrical screen member 11 and a lower imperforate sheet metal body 12. The lower body 12 is provided with a longitudinal opening or slot 13 through which the cotton plants are adapted to engage and the edges of the opening 13 are rolled outwardly, as indicated at 14. A pair of elongated guide bars 15 and 16 are disposed in the lower portion of the housing 10, being supported by means of upwardly projecting supporting members 17. These members 17 are secured to the lower imperforate housing member 12 adjacent the opposite ends of the latter. The bars 15 and 16 are provided with inwardly beveled or angled front ends 18 forming a guide mouth or entrance which is adapted to provide for the free entrance of the cotton plants, and the branches of the plants into the forward end of the body 10.

Figure 5:
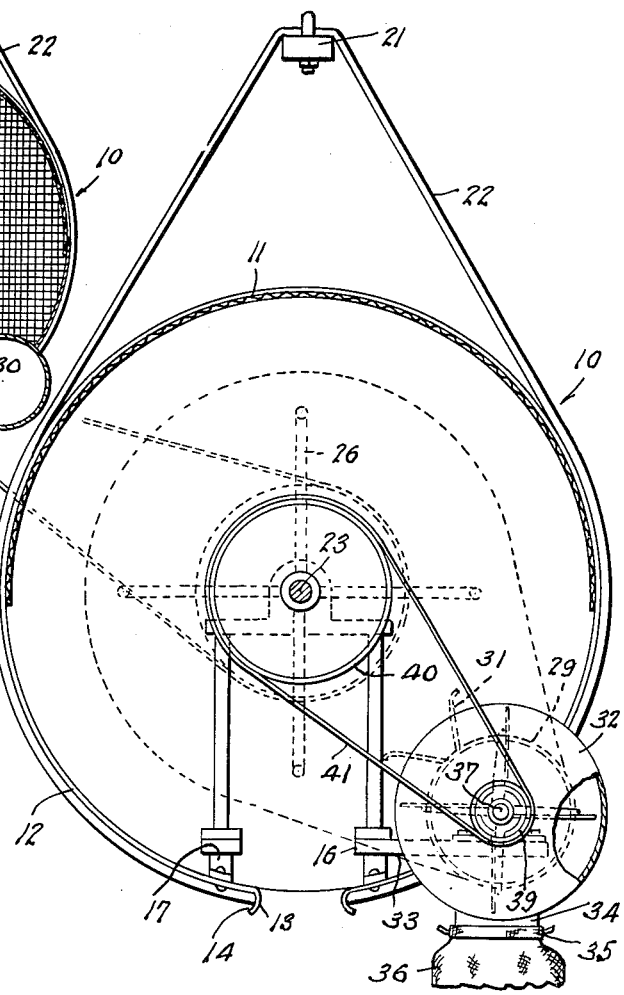
Fig. 5 is a detail rear elevation of the device, with parts broken away and shown in section.

In order to provide a means whereby the branches which may bear cotton bolls, may be raised upwardly as the machine moves along the row, there are provided upwardly directed lugs 19 which are spaced apart lengthwise of the bars 15 and 16. These lugs 19, as shown in Fig. 1, have upwardly and rearwardly inclined upper edges 20 which are adapted to raise the branches upwardly into the path of the picking fingers to be hereinafter described. The housing 10 is dependingly secured to a horizontal supporting bar 21 and as shown in Figs. 1, 4, and 5, the housing 10 has secured adjacent each end thereof a pair of upwardly directed straps 22 which project downwardly and about the housing 10. These straps 22 terminate at the downwardly and outwardly rolled edges 14 of the housing member 12. The supporting member 21 may be secured to a tractor or other mobile implement, so that the housing 10 may be moved forwardly along a row of cotton plants. A picker shaft 23 is rotatably disposed centrally of the housing 10, being journaled in a forward bearing 24 and in a rear bearing 24a. The shaft 23 has fixed thereto rearwardly divergent picker fingers 25 and 26. The fingers 25 and 26 are secured to a sleeve 27 which is fixed about the shaft 23. The pairs of picker fingers are spaced along the length of the shaft 23 within the interior of the housing 10. As shown in Fig. 3, the picker finger 25 is substantially longer than the picker finger 26 and these long and short fingers are arranged in staggered relation with a short finger 26 between a pair of long fingers 25. The shaft 23 at a point rearwardly of the housing 10 has secured thereto a driving pulley 28 which is adapted to be engaged by a belt or other flexible driving means operated from a tractor or other power unit.

The housing 10 has secured in the lower portion thereof a cylindrical and longitudinally extending suction manifold or duct 29. The manifold 29 extends partly into the housing 10 and also projects outwardly on the exterior of the housing 10. The manifold 29 is provided within the housing 10 with an elongated suction opening 30 and a pair of divergent lips 31 extend from the opening 30 in the direction of the picker fingers 25 and 26. The rear end of the suction manifold 29 has connected therewith a suction fan 32 which is secured to a supporting member 33. The suction fan 32 is connected to the suction side thereof with the manifold 29 and the outlet or discharge side of the fan 32 includes a nipple 34 having a flange 35 with which the upper end of a flexible collector or bag 36 is adapted to be engaged. The shaft 37 of the fan or suction member 32 is mounted in bearings 38 and a pulley 39 is secured to the shaft 37. A fan operating pulley 40 is mounted on the shaft 23 and a belt 41 engages about the pulleys 39 and 40.

In the use and operation of this machine, the device is supported from a mobile power means by the supporting bar 21. The device is then moved forwardly or to the right, as viewed in Figs. 1, 2 and 3. The cotton plants are adapted to enter the forward lower portion of the housing 10, being directed thereinto by the inwardly convergent ends 18 of the bars 15 and 16. These bars 15 and 16 guide the plants along the interior of the housing 10 and the lugs 19 are adapted to raise the lower branches of the plants so that the cotton bolls may be raised into contact with the rotating picker fingers 25 and 26. As the cotton is removed from the plants with rotation of the picking fingers 25 and 26, the suction generated by the suction fan 32 will draw the removed cotton into the suction manifold 29. The cotton in the manifold 29 is moved therealong and is discharged into the collector 36.

This picking machine will provide a simple means whereby cotton may be picked or removed from the plants and discharged into a collector. In the event any undesired material, such as leaves or the like, are removed from the plants with the cotton, this undesired material is subsequently separated in the conventional separating apparatus provided in the gin.

What is claimed is:

A cotton picking apparatus comprising in combination, a tubular member having an imperforate lower half and a mesh upper half, a support adapted to suspend said tubular member in extended horizontal position from a tractor or the like, a rotatable shaft journalled centrally of said tubular member and extending longitudinally thereof, inclined cotton picking fingers carried by said shaft, said fingers being alternately long and short, said imperforate lower half having a longitudinal slot extending the full length of the center of its bottom, said lower half having a pair of guide bars which serve to define said slot, the ends of said bars extending forwardly of said tubular member and being inclined to form a guide channel, a suction duct extending into said tubular member, a fan operatively associated with said duct to produce suction therein, and means operatively associated with said shaft and fan to drive same.

References Cited in the file of this patent

UNITED STATES PATENTS

| | | |
|---|---|---|
| 1,267,138 | Spry | May 21, 1918 |
| 1,401,829 | Swindell | Dec. 27, 1921 |
| 1,713,397 | Rountree | May 14, 1929 |
| 2,438,393 | Hammer et al. | Mar. 23, 1948 |
| 2,674,078 | Stukenborg et al. | Apr. 6, 1954 |